(No Model.) 2 Sheets—Sheet 1.
T. FLANIGAN.
DUMPING CART.
No. 446,096. Patented Feb. 10, 1891.
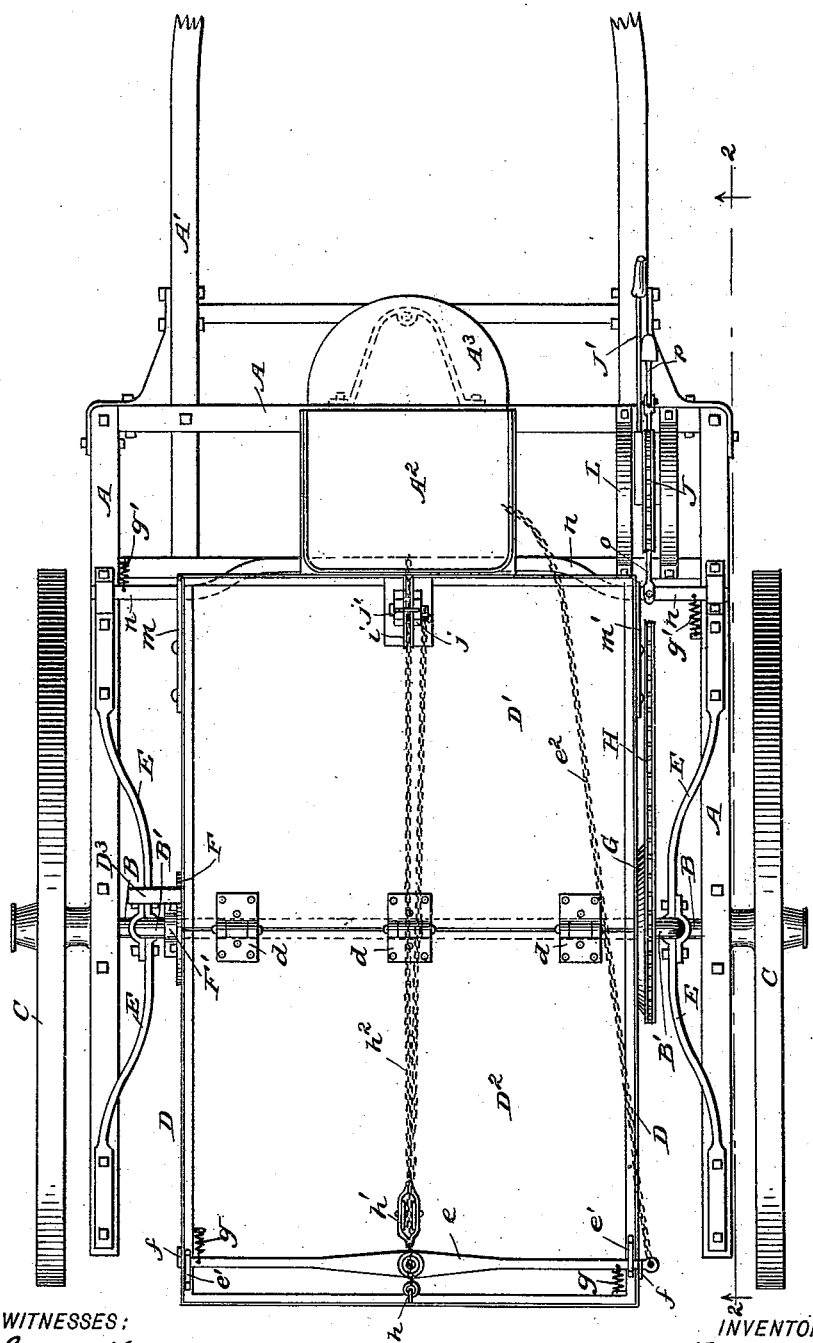
WITNESSES:
INVENTOR: T. Flanigan
BY Munn & Co.
ATTORNEYS (No Model.) 2 Sheets—Sheet 2.
T. FLANIGAN.
DUMPING CART.
No. 446,096. Patented Feb. 10, 1891.
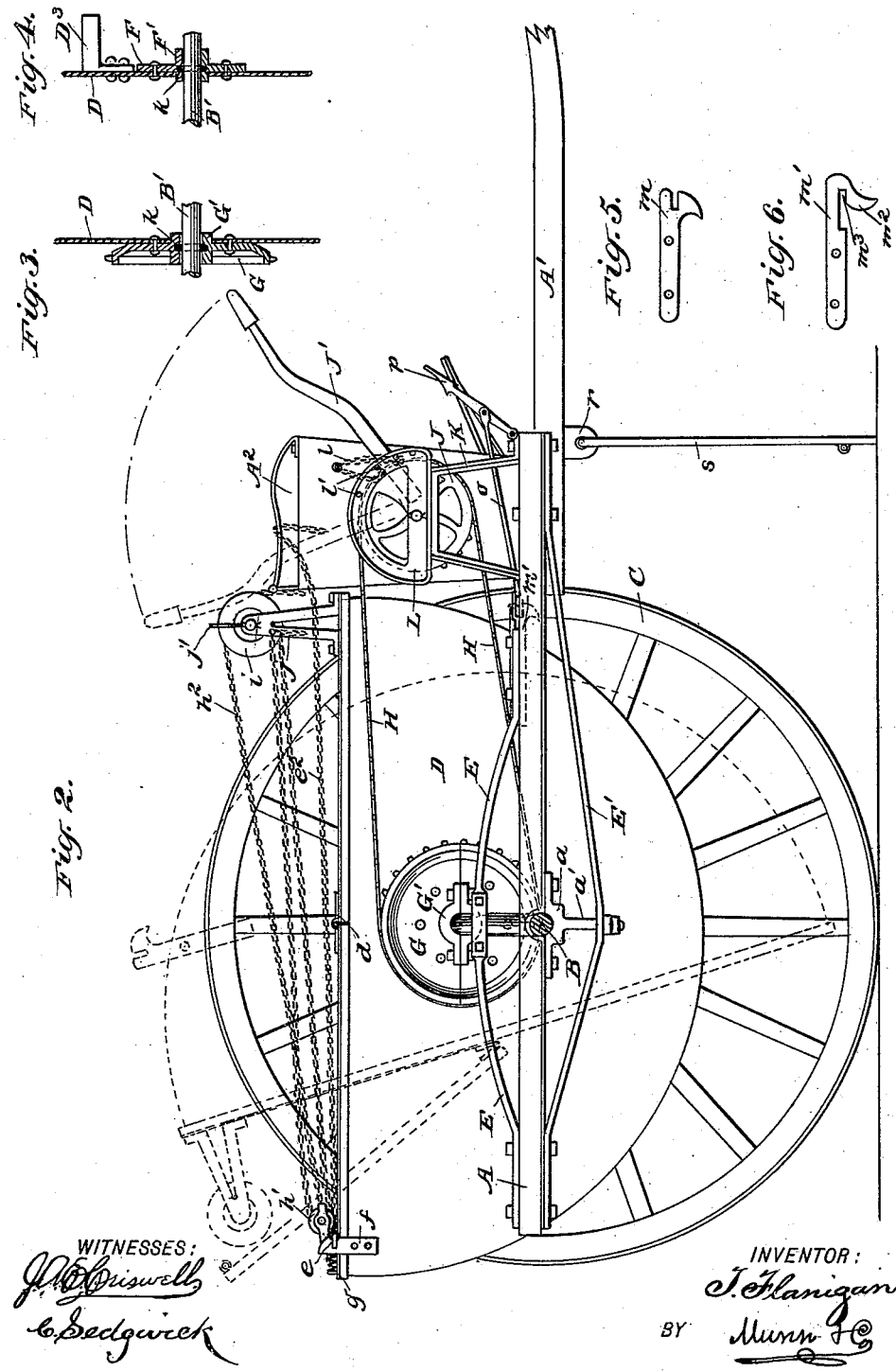
WITNESSES:
INVENTOR:
ATTORNEYS

UNITED STATES PATENT OFFICE.

TIMOTHY FLANIGAN, OF CHICAGO, ILLINOIS.

DUMPING-CART.

SPECIFICATION forming part of Letters Patent No. 446,096, dated February 10, 1891.

Application filed April 28, 1890. Serial No. 349,737. (No model.)

*To all whom it may concern:*

Be it known that I, TIMOTHY FLANIGAN, of Chicago, in the county of Cook and State of Illinois, have invented a new and Improved Dumping-Cart, of which the following is a full, clear, and exact description.

My invention relates to improvements in dumping-carts; and the object of my invention is to produce a cart that may be conveniently used as an ordinary dumping-cart, and that is especially convenient for transporting garbage and semi-liquid substances.

This invention will be hereinafter fully described, and pointed out in the claims.

Reference is to be had to the accompanying drawings, forming a part of this specification, in which similar letters of reference indicate corresponding parts in all the figures.

Figure 1 is a broken plan view of the cart embodying my invention. Fig. 2 is a sectional side elevation on the line 2 2 of Fig. 1. Fig. 3 is a detail sectional view of the sprocket-wheel as attached to the cart-body. Fig. 4 is a detail sectional view of the plate by which one side of the body is connected with the axle. Fig. 5 is a detail view of one of the catches by which the body is locked in position, and Fig. 6 is a detail view of a locking-catch secured to the opposite side of the body.

A suitable frame A is fixed to the axle B, said frame having suitable shafts A', although a pole may be substituted, if desired, a seat A$^2$ supported upon the frame, and a foot-rest A$^3$. The axle B is mounted in the wheels C in the usual manner, and is provided with a crank portion B', upon which the wagon-body D is pivoted.

The frame A is fixed to the axle B by the braces E and E'. The braces E are bolted to the top sides of the frame and are clamped to the vertical portion of the axle, and the braces E' are bolted to the under side of the frame and attached to an arm $a'$ of the clamp $a$, which incloses the lower portion of the axle B, and is bolted to the under side of the frame. The axle B will thus be held in a fixed position, and the body D may turn thereon.

The body D is semi-cylindrical in form, and is made, preferably, of steel, although other suitable material may be substituted. It is provided with a top portion D', which covers the front of the body, and with a cover D$^2$, which is hinged to the portion D' by the hinges $d$, and which swings vertically upon the said hinges, and with a laterally-extending stop D$^3$, which is fixed to one side of the body, and when the body is tipped strikes the rear portion of the brace E and prevents the body from tipping too far. A cross-bar $e$ is centrally pivoted on the rear portion of the cover D$^2$, said cross-bar projecting beyond the edges of the cover and having a limited movement in the staples $e'$, which are fixed to the upper sides of the cover D', and which inclose the ends of the cross-bar.

Attached to the sides of the body D, so as to project above the upper edges of the same, are the catches $f$, which have horizontal slots therein to engage the ends of the cross-bar $e$ and lock the cover D$^2$ in position. The cross-bar $e$ is held in engagement with the catches $f$ by the springs $g$, one of which is attached to one end of the cross-bar and to the rear portion of the cover D$^2$ behind the cross-bar, and the other of which is attached to the opposite end of the cross-bar and to the cover D$^2$ in front of the cross-bar, so that the springs pulling upon the cross-bar will hold it in engagement with the slots of the catches $f$. The catches $f$ are provided with a rounded upper end, as shown, so that when the cover D$^2$ is dropped upon the body D the cross-bar will follow the incline of the said rounded ends, and the springs $g$ will pull it into engagement with the catches, thus automatically locking the cover.

Attached to one end of the cross-bar $e$ is a chain $e^2$, which extends forward to a point adjacent to the seat A$^2$, so that by pulling upon the chain the cross-bar may be released, thus unlocking the cover. A staple $h$ is centrally fixed to the rear portion of the cover D$^2$, and attached thereto is an ordinary block-pulley $h'$, over which runs a chain $h^2$. The chain $h^2$ also passes over the grooved pulley $i$, adjacent to the seat, and the free end of the chain may be made fast to a ring on a bracket $j$. It will thus be seen that by pulling upon the chain $h^2$ when the cover is unlocked the cover may be easily raised. The pulley $i$ is mounted in suitable brackets $j$, which are fixed to the top D' of the body, and extending over the pulley is a guide $j'$, which holds the chain $h^2$ in position upon the pulley. Fixed to one side of the body D is a separable plate F, which has a flanged portion F', which fits closely upon the crank portion B' of the axle. The plate F is firmly bolted to the side of the cart, and the portion which fits upon the axle is provided with an annular groove in which is inserted a suitable packing $k$, which will prevent any substance in the cart from oozing out between the plate and the axle.

The opposite side of the cart B is provided with a separable sprocket-wheel G, which has a flanged portion G', which fits upon the crank portion B' of the axle, and which is also provided with a suitable packing $k$, to prevent the escape of liquid from the cart.

The sprocket-wheel G is connected by a chain H with a sprocket-wheel J, which is mounted in a suitable bracket K, which is fixed to the forward portion of the frame A. The sprocket-wheel J has fixed thereto a lever J', which extends upwardly to a point where it may be conveniently reached from the seat $A^2$, so that by operating the lever the wheel J may be turned and motion transmitted to the sprocket-wheel G, thus tilting the cart-body D.

The sprocket-wheel J is provided with a suitable cover L, having perforations in the sides thereof, through which pins $l'$ may be inserted, and the pins will thus engage the hand-lever J', prevent the wheel J from turning, and hold the body D in a desired position. The pins $l'$ are suspended by a chain $l$ on the side of the seat $A^2$, so that they may be handy for use.

Upon one side of the body D is a catch $m$, which projects beyond the forward portion of the body and which has a slot in the end thereof. A catch $m'$ is fixed to the opposite side of the body and projects beyond the front portion of the same, said catch having a depending tongue $m^2$ and a horizontal slot $m^3$ above the tongue. These catches $m$ and $m'$, respectively, are to engage the ends of the cross-bar $n$, which is pivoted to the forward portion of the frame A and hold the body D in a horizontal position. The ends of the cross-bar are held in engagement with the catches by the springs $g'$, which are fixed to the ends of the cross-bar and to an adjacent portion of the frame A.

When the body D is turned into a horizontal position, the tongue $m^2$ of the catch $m'$ will engage the end of the cross-bar $n$ and guide it into the slot $m^3$. The springs $g'$ will hold the cross-bar in engagement with the catch, and the opposite end of the cross-bar will at the same time engage the slot in the catch $m$. One end of the cross-bar $n$, adjacent to the catch $m'$, is provided with a forwardly-extending rod $o$, which is pivoted to the lever $p$, said lever being hinged upon the frame A and provided with a suitable treadle, so that by pressing with the foot upon the lever the rod $o$ will be pulled forward and the cross-bar $n$ released, thus leaving the body D free to turn. Pivoted to lugs $r$ upon the under sides of the shafts A' are the standards $s$, which are long enough to extend to the ground, and which form a convenient support for the cart.

To load the cart, the rear portion of the body D is slightly depressed by means of the lever J', sprocket-wheel J, and chain H, and sprocket-wheel G, and when the body is filled it is then again brought into a horizontal position and locked by the cross-bar $n$. To deposit the load, the cross-bar $n$ is released by means of the foot-lever $p$. The lever J' is moved rearwardly, thus turning the sprocket-wheels and tilting the body D, as shown by the dotted lines in Fig. 2.

The body D should be made liquid-tight, and from the foregoing description it will be readily seen that the cart is very convenient for transporting garbage and the various sorts of semi-liquid substances and refuse matter which collect in large quantities in cities.

Having thus fully described my invention, I claim as new and desire to secure by Letters Patent—

1. The combination, with the frame A, of the crank-axles B, clamps or boxes securing the sides of the frame to the lower axle-cranks and provided with arms $a'$, longitudinally-extending braces E', secured to the lower faces of the sides of the frame and connected between their ends with arms $a'$, the upper braces E, secured at their ends to the sides of the frame and clamped between their ends to the vertical members of said cranks, and the cart-body mounted on the inwardly-projecting upper cranks B', substantially as set forth.

2. The combination of the wheeled frame having the driver's seat at its front end and the closed dumping-body mounted on the frame in rear of the seat and provided with a door, a locking mechanism therefor, and a connection leading from said lock to the driver's seat, substantially as set forth.

3. The combination, with the wheeled frame having a driver's seat at its forward end and a dumping-body in rear thereof, of gearing for rotating the body on its axis, and a lever mounted adjacent to the driver's seat for operating said gearing to dump the body, substantially as set forth.

4. The combination, with the wheeled frame having the driver's seat on its front end and a closed dumping-body in rear thereof provided with a hinged cover and locking device therefor, of gearing for dumping the body, provided with an operating-lever extending up alongside of the driver's seat, and means for releasing and raising the cover from the driver's seat, substantially as set forth.

5. The combination, with the wheeled frame, the driver's seat at the front end, the closed dumping-body having a vertically-swinging cover $D^2$, opposite catches $f\ f$, and a springactuated centrally-pivoted locking-bar engaging said catches, of a flexible connection leading from said bar to the forward end of the frame in reach of the driver, the chain for operating the said cover from the driver's seat, and guide-pulleys therefor, substantially as set forth.

6. The combination, with the wheeled frame having a driver's seat at its forward end and a dumping-body in rear thereof, of a locking-bar securing the body at its forward end to the frame to prevent it from dumping, a treadle pivoted in reach of the driver's foot, and a connection between said treadle and the locking-bar, substantially as set forth.

7. The combination, with the cart-body having opposite side openings, of the separable flanges, recessed on their inner faces, provided with packing $k$, and entering the said opposite openings to receive the axles and form a tight joint, substantially as set forth.

8. The combination of a cart-body having opposite side openings, a two-part sprocket-wheel bolted to one side of the body and having flanges $G'$ on its two parts entering one of said openings and provided with a packing $k$, and a two-part plate F, bolted to the opposite side of the cart and having flanges $F'$ entering the opening therein and provided with a packing $k$, the said flanges $F'$ $G'$ forming bearings for the axles supporting the said body, substantially as set forth.

9. The combination, with the body D, pivoted upon the axle B, as shown, of means, as sprocket-wheel G, chain H, sprocket-wheel J, and lever $J'$, for operating said body, substantially as described.

10. The combination, with the sprocket-wheel J, mounted in a suitable supporting-frame and connected with the body D, as shown, of the cover L, having perforations therein, and means, as pins $l'$, for fixing the position of the sprocket-wheel, substantially as shown and described.

TIMOTHY FLANIGAN.

Witnesses:
DANIEL BYRNES,
CHAS. W. BYRNES.